United States Patent
ShafieiBavani et al.

(10) Patent No.: US 11,222,615 B2
(45) Date of Patent: Jan. 11, 2022

(54) PERSONALIZED OPTICS-FREE VISION CORRECTION

(71) Applicant: International Business Machines Corporation, Armonk, NY (US)

(72) Inventors: Elaheh ShafieiBavani, Melbourne (AU); Peter Zhong, Vermont (AU); Rahil Garnavi, Macleod (AU); Michael Raghib, Balwyn North (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/541,214

(22) Filed: Aug. 15, 2019

(65) Prior Publication Data
US 2021/0049982 A1    Feb. 18, 2021

(51) Int. Cl.
*G09G 5/37* (2006.01)

(52) U.S. Cl.
CPC ......... *G09G 5/37* (2013.01); *G09G 2320/066* (2013.01); *G09G 2320/0626* (2013.01); *G09G 2320/0666* (2013.01); *G09G 2340/045* (2013.01); *G09G 2340/0407* (2013.01); *G09G 2354/00* (2013.01)

(58) Field of Classification Search
CPC .............. G09G 5/02; G09G 2320/0626; G09G 2320/066; G09G 2320/0666; G09G 2320/0673; G09G 2320/10; G09G 2320/08; G09G 5/37; G09G 5/38; G09G 2340/0407; G09G 2340/045; G09G 2354/00; H04N 13/383
See application file for complete search history.

(56) References Cited

U.S. PATENT DOCUMENTS

| | | | |
|---|---|---|---|
| 6,483,485 B1 * | 11/2002 | Huang | G06F 3/011 |
| | | | 345/10 |
| 9,293,113 B2 * | 3/2016 | Yoshie | G09G 5/02 |
| 10,111,583 B1 | 10/2018 | Freeman | |
| 10,168,854 B2 | 1/2019 | Kockan | |
| 2011/0122144 A1 | 5/2011 | Gabay | |
| 2013/0027384 A1 | 1/2013 | Ferris | |
| 2016/0103419 A1 | 4/2016 | Callagy | |
| 2016/0370605 A1 | 12/2016 | Ain-Kedem | |
| 2016/0377864 A1 | 12/2016 | Moran | |
| 2017/0360295 A1 | 12/2017 | Oz | |
| 2018/0064330 A1 | 3/2018 | Markus | |
| 2019/0079291 A1 | 3/2019 | Joos | |

FOREIGN PATENT DOCUMENTS

| | | |
|---|---|---|
| EP | 3185069 A1 | 6/2017 |
| WO | 2017031593 A1 | 3/2017 |
| WO | 20180175889 A1 | 9/2018 |

OTHER PUBLICATIONS

Huang et al., "Eyeglasses-free Display: Towards Correcting Visual Aberrations with Computational Light Field Displays", printed on Jun. 4, 2019, 12 pages.

* cited by examiner

*Primary Examiner* — Antonio A Caschera
(74) *Attorney, Agent, or Firm* — Alexander G. Jochym

(57) ABSTRACT

A user profile associated with a first user is received. A user prescription associated with the first user is received. A historical interaction of the first user with a display is received. A global vision model is received. One or more display sets to be used on the display is determined based on at least the user profile, the user prescription, the global vision model, and the historical interaction.

14 Claims, 3 Drawing Sheets

PERSONALIZED OPTICS-FREE VISION CORRECTION

BACKGROUND

The present invention relates generally to the field of displays, and more particularly to correcting vision by image processing on a display.

SUMMARY

Embodiments of the present invention include a method, computer program product, and system for modifying a display. In one embodiment, a user profile associated with a first user is received. A user prescription associated with the first user is received. A historical interaction of the first user with a display is received. A global vision model is received. One or more display setts to be used on the display is determined based on at least the user profile, the user prescription, the global vision model, and the historical interaction.

DETAILED DESCRIPTION

A large number of adults in the world use some sort of vision correction. This vision correction can be glasses, contacts lenses, or both. Therefore, using glasses or contact lenses is an inseparable part of the lives of people worldwide. Driven by rapid technological changes, people are now spending a significant part of their day interacting with a device via some sort of screen (e.g., mobile devices, computer monitors, televisions, and video game consoles among many others).

Embodiments of the present invention provide for an optics-free vision correction system for digital displays. Embodiments of the present invention provide for vision correction that is performed by distorting the presented content on the display so that the target image is perceived by the user without the need for eyewear (e.g., glasses, contacts, etc.). Embodiments of the present invention provide for a system and model that adjusts display preferences based on the physiological and behavioral responses received from the user.

Embodiments of the present invention provide for improvements to the display experience by providing convenience and personalized settings. Embodiments of the present invention provide for improvements to the display experience by not requiring any peripheral hardware equipment (i.e., masks sensors) and therefore the system is economical along with easy to develop and utilize. Embodiments of the present invention provide for improvements to the display experience by utilizing an eye tracker which is found in common webcams built into computers that allow for applying the preferred distortion to the displayed content based on the eye gaze locations of the user.

Figure 1:
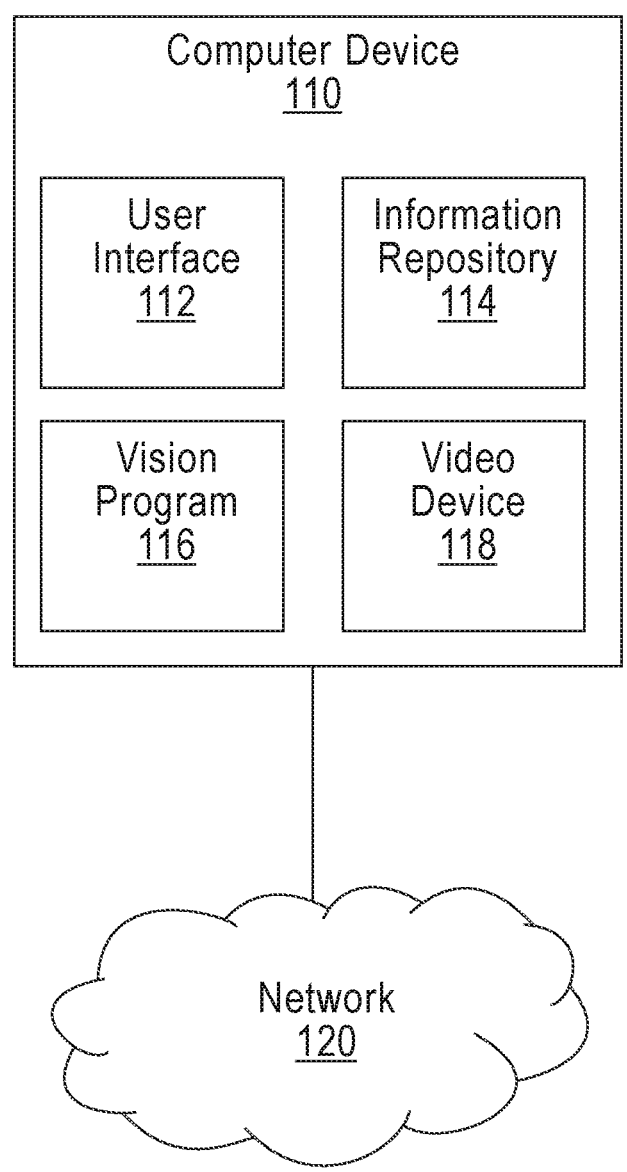
FIG. 1 is a functional block diagram of a network computing environment, generally designated 100, suitable for operation of vision program 116, in accordance with at least one embodiment of the invention.

Referring now to various embodiments of the invention in more detail, FIG. 1 is a functional block diagram of a network computing environment, generally designated 100, suitable for operation of vision program 116 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110 interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120. In an embodiment, computing device 110 may include a microphone for receiving audio.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g. database server computers, application server computers, web servers, and media servers) that act as a single pool of seamless resources when accessed within network computing environment 100.

In various embodiments of the invention, computing device 110 includes user interface 112, information repository 114, vision program 116, and video device 118.

In an embodiment, computing device 110 includes user interface 112. User interface 112 is a program that provides an interface between a user and an application. User interface 112 refers to the information (such as graphic, text, and sound) a program presents to a user and the control sequences the user employs to control the program. There are many types of user interfaces. In one embodiment, user interface 112 may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes information repository 114. In an embodiment, information repository 114 may be managed by vision program 116. In an alternative embodiment, information repository 114 may be managed by the operating system of computing device 110, another program (not shown), alone, or together with, vision program 116. Information repository 114 is a data repository that can store, gather, and/or analyze information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided information repository 114 is accessible by computing device 110. Information repository 114 includes, but is not limited to, user profile information, the prescription information for users, historic interaction with displays for users, personalized vision models associated with individual users and the global vision model. In an embodiment, the historic interaction with displays for each user may be integrated into the personalize vision model associated with the user.

In an embodiment, a personalized vision model and a global vision model may be machine learning models that model relationships between the eye prescription of the user and display settings for a display that allow for the user to optimally view the display based on the eye prescription of the user. A machine learning model includes the construction and implementation of algorithms that can learn from and make predictions on data. The algorithms operate by building a model from example inputs in order to make data-driven predictions or decisions, rather than following strictly static program instructions. In an embodiment, the model is a system which explains the behavior of some system, generally at the level where some alteration of the model predicts some alteration of the real-world system. In an embodiment, a machine learning model may be used in a case where the data becomes available in a sequential fashion, in order to determine a mapping from the dataset to corresponding labels. In an embodiment, the goal of the machine learning model is to minimize some performance criteria using a loss function. In an embodiment, the goal of the machine learning model is to minimize the number of mistakes when dealing with classification problems. In yet another embodiment, the machine learning model may be any other model known in the art. In an embodiment, the machine learning model may be a SVM "Support Vector Machine". In an alternative embodiment, the machine learning model may be any supervised learning regression algorithm. In yet another embodiment, the machine learning model may be a neural network.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

In an embodiment, computing device 110 includes vision program 116. Embodiments of the present invention provide for a vision program 116 that determines a user profile. In embodiments of the present invention, vision program 116 determines the prescription of the user associated with the user profile. In embodiments of the present invention, vision program 116 determines historic interaction of the user. In embodiments of the present invention, visions program 116 determines the display settings based on the prescription of the user, the global vision model, and the personalized vision model, if it exists. In embodiments of the present invention, vision program 116 modifies the display based on the display settings. In embodiments of the present invention, vision program 116 determines if there is user feedback. In embodiments of the present invention, vision program 116 receives the eye gaze of the user. In embodiments of the present invention, vision program 116 displays data to the user.

In an embodiment, computing device 110 includes video device 118. In an embodiment, video device 118 may be integrated into computing device 110. For example, video device 118 may be a webcam or camera that is integrated into a laptop or a display attached to a PC. In an alternative embodiment, video device 118 may be separate from computing device 110. For example, video device 118 may be a digital camera, video camera, webcam, or other video device that connects to computing device 110 via a physical wire or via some form of wireless connection. In an embodiment, video device 118 records a user of computing device 110 in real-time. In an embodiment, video device 118 may include software for eye tracking or gaze tracking of the user, fatigue detection, pupil size monitoring, blinking detection, and facial express analysis. In an embodiment, video device 118 may include a microphone for receiving audio.

As referred to herein, all data retrieved, collected, and used, is used in an opt in manner, i.e., the data provider has given permission for the data to be used. For example, the installation procedure for a video device that would be used to capture video from a user could include an option that must be selected by the owner to allow the device to capture video and use the captured video to determine eye gaze. As another example, the system could request approval from the owner of the computing device before capturing video. Any data or information used for which the provider has not opted in is data that is publicly available.

Figure 2:
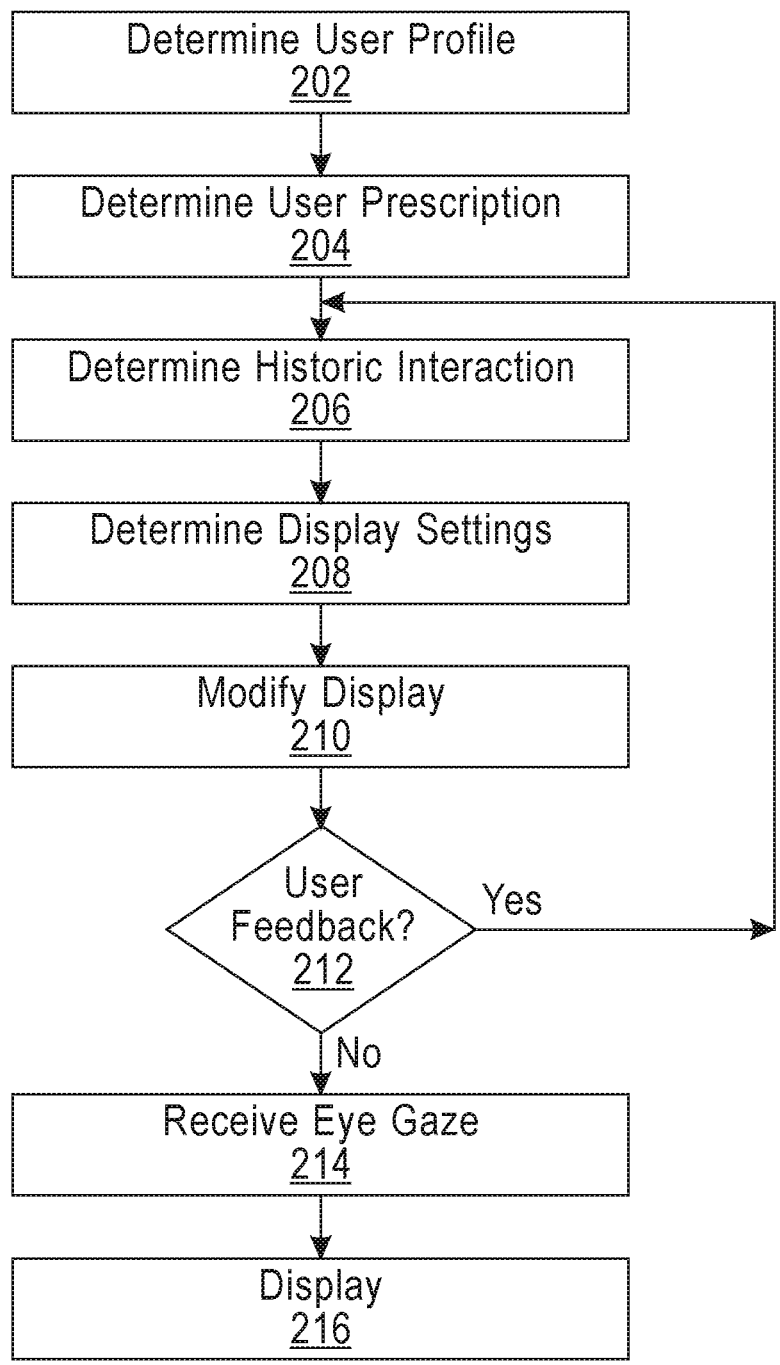
FIG. 2 is a flow chart diagram depicting operational steps for vision program 116, in accordance with at least one embodiment of the invention.

FIG. 2 is a flow chart diagram of workflow 200 depicting operational steps for vision program 116 in accordance with at least one embodiment of the invention. In an alternative embodiment, the steps of workflow 200 may be performed by any other program while working with vision program 116. It should be appreciated that embodiments of the present invention provide at least for modifying the display of the computing device 110 based at least on the prescription information for users, historic interaction with displays for users, personalized vision models associated with individual users and the global vision model. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via user interface 112, can invoke workflow 200 upon a user wanting vision program 116 to modify the display of computing device 110.

Vision program 116 determines a user profile (step 202). At step 202, video vision program 116 receives login information from a user that is trying to utilize vision program 116. In an embodiment, vision program 116 receives login information in the form of a user identification and an associated password. In an embodiment, the user identification may be a username, a ClientID, login credentials, or any other form of identification that identifies the user. In an embodiment, each set of login information is associated exclusively with a single user.

In step 202, vision program 116 verifies the login information that is received. In an embodiment, vision program 116 compares the login information received to the login information found in the user profile information in information repository 114. If the login information is incorrect, in other words the login information does not match the login information found in information repository 114, vision program 116 notifies the user of the incorrect login information and processing of flow 200 ends. In this embodiment, the user may input login information again. If the login information is correct, vision program 116 may notify the user via the user interface on the client device of the correct login information.

Vision program 116 determines the user eye prescription (step 204). At step 204, vision program 116 determines the eye prescription information of the user for the user profile determined in step 202. In an embodiment, vision program 116 may determine the eye prescription by accessing eye prescription information for the user found in formation repository 114. In an alternative embodiment, vision program 116 may determine that there is no eye prescription information for the user in information repository 114. In this embodiment, vision program 116 may query the user, vie user interface 112, for the eye prescription information. In an embodiment, eye prescription information includes, but is not limited to, OD (oculus dexter, right eye), OS (oculus sinister, left eye), SPH (Sphere), CYL (cylinder), PD (pupillary distance), Axis, Add, Prism, etc. Here, Axis is the lens meridian that contains no cylinder power to correct astigmatism. Here, Add is the added magnifying power applied to the bottom part of multifocal lenses to correct presbyopia. Here, Prism is the amount of prismatic power prescribe to compensate for eye alignment problems. Additionally, prescription information may indicate whether the user is color blind.

Vision program 116 determines historic interaction (step 206). At step 206, vision program 116 determines whether any historic information for the user is available. In other words, has the use previously used vision program 116, had a display modified by vision program 116, and the user then interacted with the display or display settings in order to fine tune the viewing experience of the user. This fine tuning, the actual modifications of the display and the intended end viewing result, is saved in information repository 114. In an embodiment, when this is the first time a user is utilizing vision program 116, there may not be any historic interaction information stored in information repository 114.

Vision program 116 determines display settings (step 208). At step 208, visual program 116 determines settings for the display of computing device 110 based on the prescription information of the user and the global vision model. In an alternative embodiment, vision program 116 may determine the settings for the display also based on the personal vision model and/or the historic interaction information of the user. In other words, visions program 116 analyzes the user prescription information using the global vision model and personal vision model/historic interaction information (if available) and determines settings of the display that will optimize the viewing of the display by the user. In an embodiment, a display may be optimized by providing clarity for the user of the visual graphics being displayed, providing proper coloring to make the website viewable to the user with color blindness, etc. In an embodiment, the display settings that may be provided can include, but is not limited to, zoom level, contrast, distortion, color tune, brightness, sharpness etc.

Vision program 116 modifies the display (step 210). At step 210, vision program 116 applies the determined display settings to the display of computing device 110. In an embodiment, the display settings will be applied to the visual representations being shown in the user interface 112. In an embodiment, the display settings will be applied to whatever is being displayed by the display being shown in user interface 112. For example, a website the user was viewing or a program the user was using. In an alternative embodiment, the display settings will be applied to a test image being displayed by the display being show in user interface 112. For example, the test display may be specific to visually show the optimizations that are trying to be realized by the display settings.

Vision program 116 determines if there is user feedback (decision step 212). At decision step 212, visual program 116 determine whether the user has provided feedback in response to the modified display via an indication. In an embodiment, feedback may be provided by video device 118. In this embodiment, video device 118 may record information related to the eye fatigue of the user such as redness of eyes, facial expressions, blinks, pupil size, as well as voice feedback, and/or the change of position/distance of the user from the display. In an alternative embodiment, feedback or change of display settings may be provided directly by the user via user interface. In an embodiment, user feedback is received (decisions step 208, yes branch), processing proceeds to step 206 to update the models and the display settings. In an embodiment, if user feedback is not received (decision step 208, no branch), processing proceeds to step 214.

Vision program 116 receives eye gaze (step 214). At step 214, vision program 116 receives the eye gaze of the user via video device 118. In an embodiment, vision program 116, based on the eye gaze of the user, determines where the user is looking on the display of computing device 110.

Vision program 116 displays the modified display (step 216). At step 216, vision program 116 uses the determined display settings and received eye gaze to display the modified display on computing device 110. In an embodiment, vision program 116 will modify the entire graphic that is being displayed by the user interface 112 on the display of computer device 110. In an alternative embodiment, vision program 116 will modify a part or subsection of the graphic that is being displayed by the user interface 112 on the display of computer device 110. In this embodiment, the part of the graphic that is being modified is based on where the eye gaze of the user is focused on the display.

Figure 3:
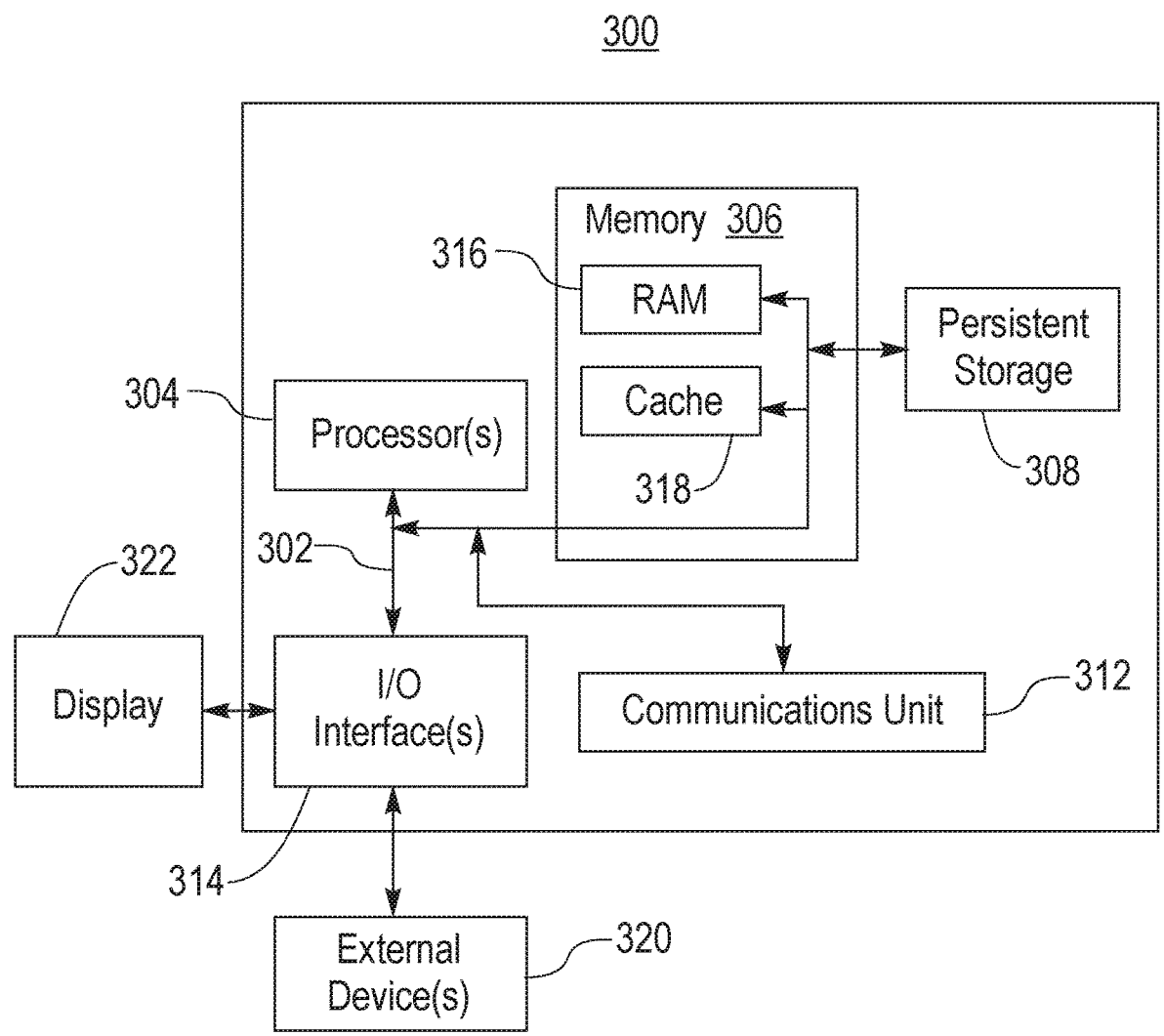
FIG. 3 is a block diagram depicting components of a computer, generally designated 300, suitable for executing vision program 116, in accordance with at least one embodiment of the invention.

FIG. 3 is a block diagram depicting components of a computer 300 suitable for vision program 116, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions vision program 112 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising the steps of:
    receiving, by one or more computer processors, a user eye prescription associated with the first user;
    receiving, by one or more computer processors, a personal vision model of the first user, wherein the personal vision model is a machine learning model that models relationships between the user eye prescription and display settings on a display;
    receiving, by one or more computer processors, a global vision model, wherein the global vision model is a machine learning model that models relationships between two or more users eye prescription and display settings on a display;
    determining, by one or more computer processors, one or more display settings to be used on a display based on at least the user eye prescription, the global vision model, and the personal vision model;
    displaying, by one or more computer processors, one or more visual representations on the display using the one or more determined display settings;
    receiving, by one or more computer processors, user feedback to the display, wherein the user feedback is eye fatigue of the user;
    updating, by one or more computer processors, the display settings based on the user feedback; and
    updating, by one or more computer processors, the personal vision model based on the user feedback.

2. The computer-implemented method of claim 1, wherein the one or more display settings is selected from the group consisting of zoom level, contrast, distortion, color tune, brightness, and sharpness.

3. The computer-implemented method of claim 1, wherein the user prescription is selected from the group consisting of OD (oculus dexter, right eye), OS (oculus sinister, left eye), SPH (Sphere), CYL (cylinder), PD (pupillary distance), Axis, Add, and Prism.

4. The computer-implemented method of claim 1, wherein the eye fatigue is pupil size.

5. The computer-implemented method of claim 1, wherein the eye fatigue is facial expressions.

6. The computer-implemented method of claim 1, wherein the eye fatigue is a change of position or distance of the user from the display.

7. The computer-implemented method of claim 1, further comprising:
    receiving, by one or more computer processors, an eye gaze of the first user; and
    modifying, by one or more computer processors, a subsection of the one or more visual representations on the display based on the eye gaze using the one or more determined display settings.

8. A computer program product, the computer program product comprising:
one or more computer readable storage media; and
program instructions stored on the one or more computer readable storage media, the program instructions comprising:
program instructions to receive a user eye prescription associated with the first user;
program instructions to receive a personal vision model of the first user, wherein the personal vision model is a machine learning model that models relationships between the user eye prescription and display settings on a display;
program instructions to receive a global vision model, wherein the global vision model is a machine learning model that models relationships between two or more users eye prescription and display settings on a display;
program instructions to determine one or more display settings to be used on a display based on at least the user eye prescription, the global vision model, and the personal vision model;
program instructions to display one or more visual representations on the display using the one or more determined display settings;
program instructions to receive user feedback to the display, wherein the user feedback is eye fatigue of the user;
program instructions to receive update the display settings based on the user feedback; and
program instructions to updated the personal vision model based on the user feedback.

9. The computer program product of claim 8, wherein the one or more display settings is selected from the group consisting of zoom level, contrast, distortion, color tune, brightness, and sharpness.

10. The computer program product of claim 8, wherein the user prescription is selected from the group consisting of OD (oculus dexter, right eye), OS (oculus sinister, left eye), SPH (Sphere), CYL (cylinder), PD (pupillary distance), Axis, Add, and Prism.

11. The computer program product of claim 8, further comprising program instructions, stored on the one or more computer readable storage media, to:
program instructions to receive an eye gaze of the first user; and
program instructions to modify a subsection of the one or more visual representations on the display based on the eye gaze using the one or more determined display settings.

12. A computer system, the computer system comprising:
one or more computer processors;
one or more computer readable storage media; and
program instructions stored on the one or more computer readable storage media for execution by at least one of the one or more computer processors, the program instructions comprising:
program instructions to receive a user eye prescription associated with the first user;
program instructions to receive a personal vision model of the first user, wherein the personal vision model is a machine learning model that models relationships between the user eye prescription and display settings on a display;
program instructions to receive a global vision model, wherein the global vision model is a machine learning model that models relationships between two or more users eye prescription and display settings on a display;
program instructions to determine one or more display settings to be used on a display based on at least the user eye prescription, the global vision model, and the personal vision model;
program instructions to display one or more visual representations on the display using the one or more determined display settings;
program instructions to receive user feedback to the display, wherein the user feedback is eye fatigue of the user;
program instructions to receive update the display settings based on the user feedback; and
program instructions to updated the personal vision model based on the user feedback.

13. The computer system of claim 12, wherein the one or more display settings is selected from the group consisting of zoom level, contrast, distortion, color tune, brightness, and sharpness.

14. The computer system of claim 12, further comprising program instructions, stored on the one or more computer readable storage media for execution by the at least one of the one or more computer processors, to:
program instructions to receive an eye gaze of the first user; and
program instructions to modify a subsection of the one or more visual representations on the display based on the eye gaze using the one or more determined display settings.

* * * * *